M. PETTIT & L. S. ROLL.
CHILD'S VEHICLE.
APPLICATION FILED NOV. 5, 1909.
970,849.
Patented Sept. 20, 1910.
2 SHEETS—SHEET 1.
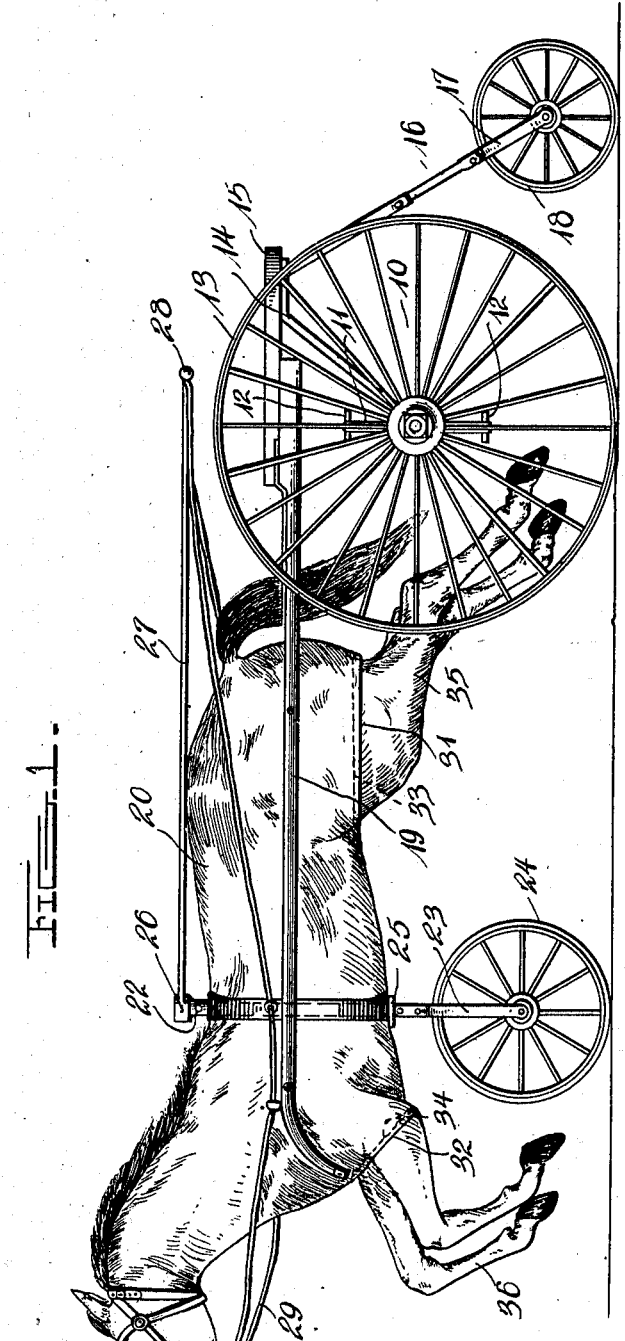
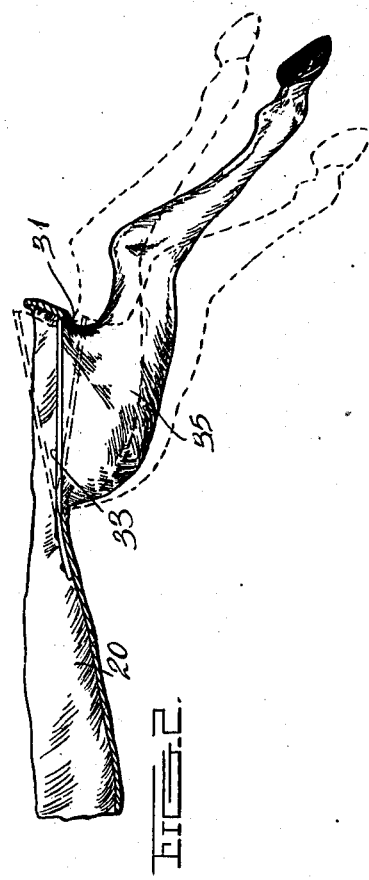
Witnesses
Ernest Crocker
L. N. Gillis
Inventors
Morgan Pettit,
and Lewis S. Roll.
By
Attorneys

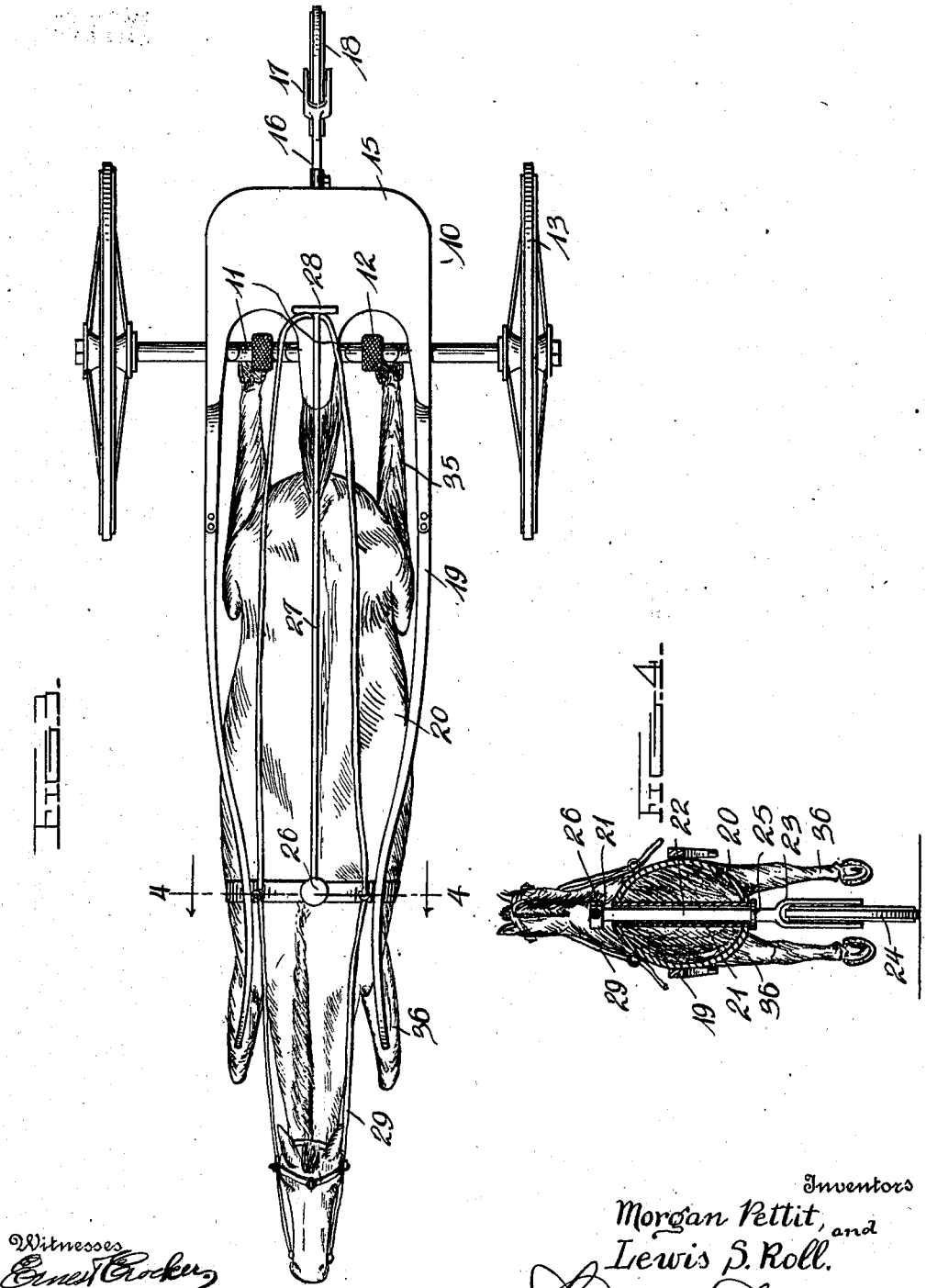

UNITED STATES PATENT OFFICE.

MORGAN PETTIT AND LEWIS S. ROLL, OF CONNERSVILLE, INDIANA.

CHILD'S VEHICLE.

970,849.     Specification of Letters Patent.     Patented Sept. 20, 1910.

Application filed November 5, 1909. Serial No. 526,468.    REISSUED

*To all whom it may concern:*

Be it known that we, MORGAN PETTIT and LEWIS S. ROLL, citizens of the United States, residing at Connersville, in the county of Fayette, State of Indiana, have invented certain new and useful Improvements in Children's Vehicles; and we do hereby declare the following to be a full, clear, and exact description of the invention, such as will enable others skilled in the art to which it appertains to make and use the same.

This invention relates to vehicles such as are used by children, and has special reference to a form of vehicle arranged to represent a sulky drawn by an animal such as a horse or the like.

One object of the invention is to improve the general construction of devices of this character.

A second object of the invention is to provide means to relieve the strain upon the shafts of the sulky and prevent accidental tipping backward of the vehicle.

A third object of the invention is to provide means for preventing fracture of the animal's legs by striking against immovable objects.

With the above and other objects in view, the invention consists in general of a horse having a pair of shafts between which an animal of some description is supported, the forward part of the animal being supported on a guiding wheel and its legs being resiliently mounted on the body, in combination with means to prevent the accidental tipping backward of the vehicle.

The invention further consists in certain novel details of construction and combinations of parts hereinafter fully described, illustrated in the accompanying drawings, and specifically set forth in the claim.

In the accompanying drawings, like characters of reference indicate like parts in the several views, and:—Figure 1 is a side elevation of a vehicle constructed in accordance with this invention. Fig. 2 is a view showing the means for supporting the animal's legs on the body so that they are permitted to move in either direction from their normal position. Fig. 3 is a top plan view of the vehicle. Fig. 4 is a section on the line 4—4 of Fig. 3.

The numeral 10 indicates the sulky axle and this axle is provided with oppositely disposed cranks 11 on each of which is mounted a suitable pedal 12. The main wheels 13 are carried upon the axle 10 and are so mounted on the axle as to rotate therewith as the latter is rotated. Extending upward from the axle and to the rear thereof are braces 14 in the lower ends of which the axle is mounted to freely rotate, and upon the rear ends of these braces is carried a seat 15, the seat thus being above and to the rear of the axle. Extending upwardly and downwardly from the seat 15 is a brace 16 having a forked lower end 17 between the sides of which is mounted a rear supporting wheel 18. This brace 16 is telescopic and the two parts thereof are held in adjusted position by means of a suitable set screw or bolt as clearly shown in Fig. 1. It will now be observed that this portion of the vehicle forms a triangle of which the wheels 13 are the front wheels and the wheel 18 the rear wheel. This rear wheel 18 is so arranged that its plane of revolution is parallel to the planes of revolution of the wheels 13 at all times.

Extending forwardly from the under side of the seat 15 are shafts 19 and between these shafts is supported the body of an animal as at 20. This animal is here represented as a horse but it will be obvious that any other animal may be employed such as a mule, zebra, or in fact, any kind of animal whatever. Extending downwardly through the body 20 is a sleeve 21 wherein is supported a shaft 22 having a forked lower end 23 and in this fork is held a steering wheel 24. Upon the shaft 23 there is provided a collar 25 which prevents upward movement of the shaft through the body while upon the upper end of the shaft there is a collar 26 which limits the downward movement of said shaft and from this collar 26 there extends backward over the animal's crupper a steering bar 27 provided with a handle 28 arranged in a convenient position to be grasped by the child. Reins 29 are also provided which lead from the horse's body 20 back to the handle 28 so that the simulation of driving may be more accurately obtained. The horse, of course, is provided with any suitable harness that may be desired but the particular form does not constitute any part of the invention and is therefore not herein described.

The body 20 is preferably made hollow both for lightness and for purposes now to be described. The hollow body 20 is open on its lower side as at 31 at the point of juncture of the rear legs and body and as at 32 at the point of juncture of the front legs and body. Springs 33 and 34 are secured at one end to the body and have their free ends extending over the openings 31 and 32 respectively. To these springs are attached the rear legs 35 and the front legs 36 respectively and the legs are so shaped and arranged that they may either swing up slightly into the body or may be forced downward away therefrom as can readily be observed by reference to Fig. 2, wherein the full lines show the normal position of one of the rear legs while the dotted lines show the positions when the legs are swung downward and upward as before noted. By means of this peculiar construction if the animal's legs come in contact with an obstruction while going forward the springs will yield and permit the lower ends of the legs to move upward so as to pass over the obstruction while in like manner if the vehicle be running backward the springs will yield and prevent stoppage with any sudden shock or jar with the consequent breakage of the animal's legs. By this means the danger of injury to the animal's legs and resultant destruction of the parts of the vehicle are eliminated.

It is obvious that the ordinary type of swinging foot power may be used in place of the rotary treadles 12 and cranks 11 and that the steering wheel 24 may be replaced by a structure having two wheels, if desired.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claim.

Having thus described the invention, what is claimed as new, is:—

In a child's vehicle, a figure representing an animal and having a body and legs, said body being hollow and having openings therein at the points of juncture of the legs, and springs each extending over one of the openings and having one end of each spring fixed to the body and the free end thereof attached to and supporting one of the legs.

In testimony whereof, we affix our signatures, in presence of two witnesses.

MORGAN PETTIT.
LEWIS S. ROLL.

Witnesses:
  REUBEN CONNER,
  ALBERT L. CHRISMAN.